United States Patent [19]
Fünfschilling et al.

[11] Patent Number: 6,111,631
[45] Date of Patent: Aug. 29, 2000

[54] FERROELECTRIC LIQUID CRYSTAL CELL WITH A SATURATED SWITCHING ANGLE OR SUFFICIENT TO GIVE RISE TO LINEAR LIQUID CRYSTAL DOMAINS

[75] Inventors: Jürg Fünfschilling, Basel; Martin Schadt, Seltisberg, both of Switzerland

[73] Assignee: Rolic AG, Zurich, Switzerland

[21] Appl. No.: 08/986,711

[22] Filed: Dec. 8, 1997

[30] Foreign Application Priority Data

Dec. 13, 1996 [CH] Switzerland .............................. 3073/96

[51] Int. Cl.$^7$ .................................................. C09K 19/02
[52] U.S. Cl. ........................................... 349/172; 349/171
[58] Field of Search ..................................... 349/172, 171

[56] References Cited

U.S. PATENT DOCUMENTS

| | | | |
|---|---|---|---|
| 5,453,861 | 9/1995 | Shinjo et al. | 359/78 |
| 5,629,788 | 5/1997 | Mori et al. | 349/172 |
| 5,760,863 | 6/1998 | Funfschilling et al. | 349/172 |

OTHER PUBLICATIONS

Fünfschilling J. et al., "Fast Responding and Highly Multiplexible Distorted Helix Ferroelectric Liquid–Crystals Display", Journal of Applied Physics, Oct. 15, 1989, pp. 3877–3882.

Chandani, A.D.L., et al. "Tristable Switching In Surface Stabilized Ferroelectric Liquid Crystals with a Large Spontaneous Polarization", Japanese Journal of Applied Physics, Part 2, May 1, 1988, pp. L729–L732.

*Primary Examiner*—William L. Sikes
*Assistant Examiner*—Heidi L. Eisenhut
*Attorney, Agent, or Firm*—Joel F. Spivak

[57] ABSTRACT

The commercial production of DHF (Deformed Helix Ferroelectric) cells, in particular DHF color display cells, has scarcely become established to date. This is in particular because the DHF cells required for this purpose and based on the known prior art have short switching times and a good angular range of view but relatively high voltages and currents are required for their operation. Moreover, for the production of a DHF cell, the liquid crystal mixture must additionally be oriented or formatted by means of an electric field. The present invention relates to a ferroelectric display cell which does not have these disadvantages and in particular is distinguished by the fact that the display is dark at U=0 and bright at |U|>0, the current-voltage hysteresis characteristic has two maxima of equal size, the birefringence Δn in the field-free state is greater than that in the saturated state and the saturation voltage is relatively low even with very small spontaneous polarization $P_s$ ($P_s$<5 nC/cm$^2$).

18 Claims, 7 Drawing Sheets

FERROELECTRIC LIQUID CRYSTAL CELL WITH A SATURATED SWITCHING ANGLE OR SUFFICIENT TO GIVE RISE TO LINEAR LIQUID CRYSTAL DOMAINS

BACKGROUND OF THE INVENTION

Field of the Invention

The invention relates to a liquid crystal cell—also referred to below as display cell—having a ferroelectric, chiral smectic liquid crystal layer, namely a display cell according to the preamble of claim 1.

Known liquid crystal cells have a nematic liquid crystal configuration and, in accordance with this configuration, are referred to as TN or STN cells. Here, TN is Twisted Nematic and STN is Super Twisted Nematic. Such cells are adequate for many electro-optical applications. Thus, most of the liquid crystal displays known today have active matrix-driven TN cells. In these display cells, a display segment which can be electrically driven by means of an associated semiconductor circuit is coordinated with each image point. Many of the electro-optical requirements, such as contrast, gray steps and orientability of the liquid crystal layer, are optimally met by TN displays, which explains their wide use.

However, the TN display cells cannot meet all requirements to an equal extent. Important disadvantages are a limited angular range of view and long switching times. These disadvantages are due to the physics of the TN cell and cannot be easily overcome. Thus, in this display cell, switching on is electrically driven but not switching off. The result of this is that the switching times, i.e. the speeds for image build-up and image clearance, determined by the viscosity and the elastic restoring forces of the nematic liquid crystal mixture, are indeed limited. TN cells are therefore not intended for displaying sequences of images following one another in quick succession. This applies, for example, to many modern multimedia applications and the like.

Attempts were made at an early stage to find an alternative to the TN display cell. Possible faster media are the ferroelectric, chiral smectic liquid crystals. These have a spontaneous polarization which permits much stronger coupling of the liquid crystal to the electric field than is possible in the case of TN cells. In particular, however, this coupling is linear in the field. This has two important consequences. First, the torques are large even at low driving voltages and, secondly, in a display cell containing a ferroelectric, chiral smectic liquid crystal layer, both switching on and switching off are electrically driven and thus relatively rapid.

Ferroelectric, chiral smectic liquid crystal cells have a birefringent liquid crystal mixture which is also referred to below as an $S_c^*$ layer (here, * represents the chirality of the liquid crystal layer), optionally forms a helical configuration and can be influenced or deformed by the action of an electric field so that its optical anisotropy changes.

The term smectic denotes a layered structure which is based on the fact that the molecules of the liquid crystal mixture have polarizable cores and apolar side chains. In the smectic phase, the polar cores in this case are arranged in the smectic layers, which in turn are separated from one another by apolar layers comprising side chains. In ferroelectric liquid crystal cells, the smectic layers are essentially perpendicular to the plates of the display cell.

The $S_c^*$ layer is also distinguished by further properties. Thus, the molecular cores belonging to a smectic layer and arranged essentially parallel to one another are not perpendicular to the associated planes of the layers but are tilted away from the normal of the plane by an angle θ. Further important properties of the $S_c^*$ layer are based on their chirality. In fact, this gives the $S_c^*$ layer a spontaneous polarization $P_s$, whose direction lies in the plane of the smectic layers and perpendicular to the molecules. This means that an electric field applied to the display cell interacts strongly with this spontaneous polarization, permitting a substantial reduction in the switching times known for TN and STN cells. The chirality furthermore results in the axes of the liquid crystal molecules being rotated relative to one another from layer to layer without external forces, with the result that a helix with the pitch p forms.

Discussion of the Prior Art

A known ferroelectric, chiral smectic liquid crystal cell is disclosed in EP-B 0 309 774. Thus, the DHF (Deformed Helix Ferroelectric) cell known from this prior publication has a pair of transparent plates which together enclose the $S_c^*$ layer and are each provided with a surface structure orienting the molecules of the $S_c^*$ layer, provided with electrodes generating an electric field in the liquid crystal and each provided with a polarizer. Here, the surface structures facing the $S_c^*$ layer have an orienting effect on the adjacent liquid crystal molecules.

In the rest state, i.e. without an applied electric field, the DHF cell exhibits a certain light transmittance. If a voltage is applied to the electrodes, an electric field is generated in the $S_c^*$ layer and reorients the molecules and hence reorients the individual smectic layers, finally resulting in a change in the light transmittance. This electro-optical effect on which the DHF display is based is known to a person skilled in the art. The starting point is a liquid crystal configuration which has a short pitch p. The pitch p is chosen so that the light is averaged out over the coils of the helix, i.e. experiences only an averaged refractive index. For an undistorted helix, this results in a birefringent layer having an optical axis parallel to the helix axis. If a voltage is applied to the electrodes of the two plates, torques act on the individual smectic layers. These torques result in the above-mentioned reorientation of the individual smectic layers and hence also in a rotation of the optical axis in a plane parallel to the plates adjacent to the liquid crystal layer. The rotation of the optical axis as a function of the applied voltage can be determined in practice by measuring the switching angle α. The saturated switching angle is defined here as the angle α which no longer changes on increasing the applied operating voltage, which is characterized in practice by periodic signals or drive pulses.

Known DHF cells are black/white displays. They generate continuously changing gray steps depending on the applied electric field. If the electrode segments each defining an image point are divided into three sub-electrodes and provided with suitable color filters for the colors red, green and blue, it is possible in a known manner to produce DHF color displays in which the red, green and blue color points can be driven from dark to maximum brightness by means of a voltage source.

The commercial production of both black/white displays and DHF color displays has scarcely become established to date. In particular, this is because, owing to the known prior art, the DHF cells required for this purpose have short switching times, gray steps and a good angular range of view but require relatively high voltages and currents for their operation. In addition, in the production of a DHF cell and for achieving high contrast values, the liquid crystal mixture must additionally be oriented and formatted by means of an electric field, making the production process even more difficult.

SUMMARY OF THE INVENTION

Starting from EP-A 0 405 346, it is now the object of the invention to provide a liquid crystal cell which has the essential advantages of known ferroelectric display cells, namely little dependence on the angle of view, gray steps and short switching times but does not have the above-mentioned disadvantages of the known DHF display cell.

This object is achieved, according to the invention, by a liquid crystal cell having the features of patent claim 1, namely by a cell which is distinguished by the fact that the layer thickness d of the liquid crystal layer is less than the helix pitch d, the saturated switching angle α is greater than 60°, the current-voltage characteristic of the cell has two maximum values, one for U>0 and one for U<0, and the optical pitch difference $\Delta n \cdot d_{eff}$ where U=0 is greater than that in the two optically fully driven, saturated states for U>0 and U<0, Δn being the birefringence and $d_{eff}$ being the distance covered by the light in the liquid crystal between a polarizer and an analyzer.

Preferred embodiments of the display cell according to the invention are distinguished in particular by the following characteristics explained in more detail below.

The display is dark when there is no applied drive voltage (U=0).

If a drive voltage is applied to the cell, the display becomes bright.

The current-voltage hysteresis characteristic of the display cell has two maxima of almost the same size.

The birefringence Δn in the field-free state (=zero field) is greater than in the two fully driven, saturated states, in which a further increase of the applied electric field produces no significant change in transmittance.

In contrast to known DHF cells, the saturation voltage is low even with very small spontaneous polarization ($P_s$ <5nC/cm$^2$).

It should be pointed out here that it is true that a display cell which has an $S_c^*$ layer and likewise exhibits a current-voltage hysteresis characteristic with two maxima is known from A. D. L. Chandani et al., Jpn. J. Appl. Phys., 27 (1988), L 729. In this so-called antiferroelectric display cell, the spontaneous polarizations $P_s$ change their sign from molecular plane to molecular plane, which is not the case with the display cell according to the invention. The antiferroelectric display cell is moreover characterized in that the birefringence Δn of the liquid crystal layer at U=0 is smaller than that with an applied electric field. This known display cell is thus fundamentally different from the subject of the present invention and does not suggest the achievement of the object according to the invention.

BRIEF DESCRIPTION OF THE DRAWINGS

The invention is described in more detail below with reference to the attached drawings.

DESCRIPTION OF THE PREFERRED EMBODIMENTS

Before the advantageous electro-optical effects which can be produced with the cell according to the invention are explained, the general structure of a preferred, color display cell will be described in more detail.

Figure 1:
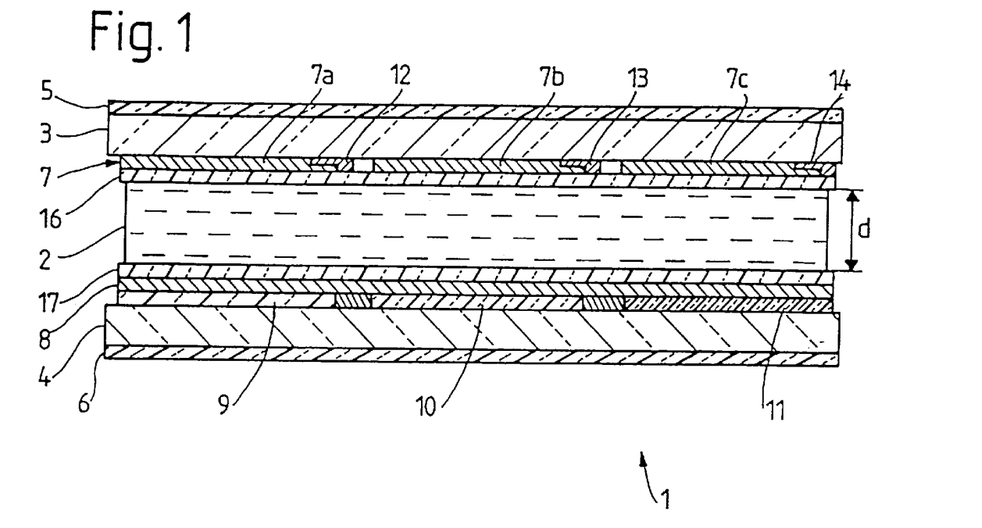
FIG. 1 shows a schematic section through a color display cell according to the invention.
Figure 2:
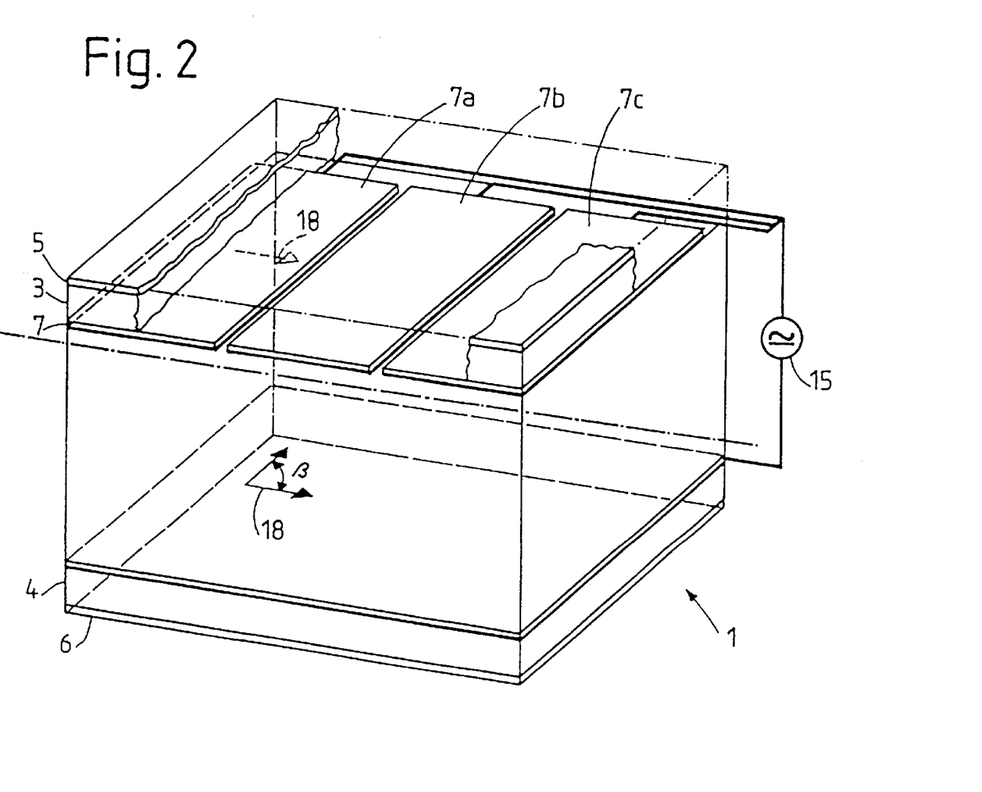
FIG. 2 shows a simplified, perspective view of the section shown in FIG. 1.

The display cell shown in FIGS. 1 and 2 and denoted as a whole by 1 has an $S_c^*$ layer 2 which has a layer thickness d arranged between two plates 3 and 4 parallel to one another and comprising transparent material. Suitable transparent material for the parallel plates 3 and 4 is, for example, glass, acrylic glass or plastic films. The layer thickness d is preferably about 2 μm to 3 μm, for example about 2.1 μm. Since this cell is a direct-view display cell, the distance $d_{eff}$ covered by the light within the liquid crystal is equal to the layer thickness d.

A polarizer 5 is present on the outside of the upper plate 3 and is preferably connected to the plate 3, for example adhesively bonded to it. Accordingly, a polarizer 6 which serves as an analyzer if the light is incident from above in the embodiment shown is coordinated in an analogous manner with the lower plate 4. Alternatively, these polarizers may also be arranged inside the cell or even be provided by the plates 2 and 3 if they consist, for example, of a plastic which contains oriented dichroic dye molecules.

On their surfaces facing the liquid crystal layer 2, the plates 3 and 4 have transparent electrodes 7 and 8 which form the usual electrode segments intended for displaying characters or image points, the section shown here illustrating only those elements of an individual electrode segment which is divided into the three color pixels for the colors red, green and blue for displaying an image point. Thus, the upper segment of the electrode 7 is divided into three sub-electrodes 7a, 7b and 7c and the opposite segment of the electrode 8, which may also be segmented, is provided with color filters 9, 10 and 11 coordinated with the individual sub-electrodes 7a, 7b and 7c. Each sub-electrode 7a, 7b and 7c also has electronic components 12, 13 and 14, such as, for example, thin-film transistors and the like. The latter together with driver electronics 15 with which the sub-electrodes 7a, 7b and 7c can be driven independently of one another form the active matrix already mentioned at the outset. Alternatively, driving may also be effected by an external electronic circuit. (According to the invention, cells not addressed by an active matrix are therefore also possible.)

Figure 3:
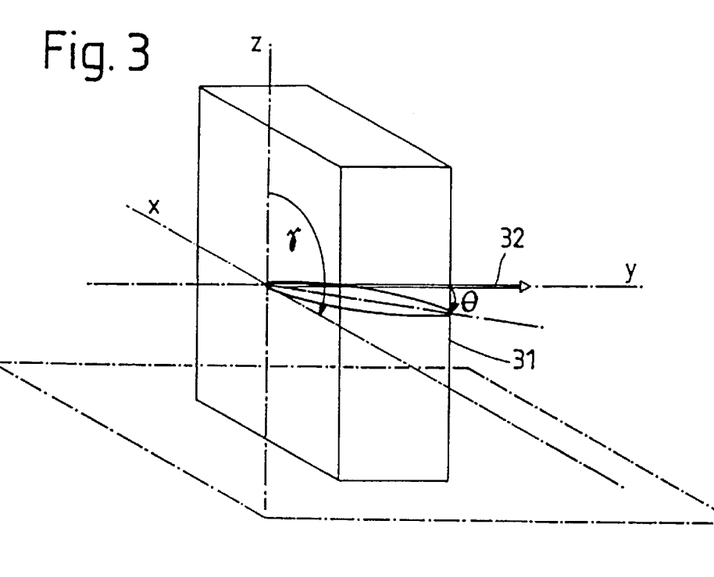
FIG. 3 shows an enlarged, graphic representation of an individual smectic layer of an $S_c^*$ phase.

Those surfaces of the glass plates 3 and 4 which face the $S_c^*$ layer are furthermore treated in such a way that they have an orienting effect on the adjacent liquid crystal molecules and hence also on the total liquid crystal layer and therefore determine the direction of the director. This treatment consists, for example, in coating with a polymer layer and in rubbing the surfaces in one direction. This may consist in polyimide orientation layers rubbed parallel, such as, for example, the polyimide orientation layer SE 510 from Nissan Chemical Industries Ltd. Other possibilities are photo-oriented orientation layers or oblique incidence vacuum deposition of orienting layers. Such layers are shown in FIG. 3 and denoted by 16 and 17.

The result of such treatments is also referred to below as surface orientation. This is shown on the two plates 13 and 14 by the arrow 18, the surface orientation of the upper plate 3 being parallel to that of the lower plate 4.

The polarizer 5 belonging to the upper plate 3 is arranged in such a way that its polarization direction is parallel to the surface orientation. The polarization direction of the polarizer 6 belonging to the lower plate 4 makes an angle β with the direction of the surface orientation or with the polarization direction of the polarizer 5. This angle β is preferably 90°. However, other polarizer arrangements are also entirely possible and likewise permit good results. They can be readily determined by simple optimization.

The liquid crystal mixture which may be used for the purpose according to the invention and forms an $S_c^*$ phase in the cell is distinguished in particular by a saturated switching angle α>60° and a pitch p>d.

Two examples of liquid crystal mixtures according to the invention are shown in Tables 1 and 2 attached at the end and are designated as test mixtures A and B. They are additionally distinguished by the fact that they have a cholesteric phase N* above the $S_c^*$ phase, i.e. on cooling from about 100° C. to room temperature they are transformed from the isotropic phase into a cholesteric phase N* and then directly into the desired $S_c^*$ phase.

For the production of the liquid crystal cell according to the invention, the ferroelectric liquid crystal mixture is filled into a prepared cell with a plate spacing d of about 2.1 μm and orientation layers rubbed parallel. This may be effected in a known manner by capillary action and is done at a temperature of about 90° C. The cell is then cooled to 50° C. within 20 sec, the desired ferroelectric liquid crystal configuration forming automatically. On cooling the liquid crystal layer from the N* phase to the $S_c^*$ phase, microscopic domains of a few μm width and a few hundred μm length additionally form and likewise do so spontaneously.

Figure 8A:
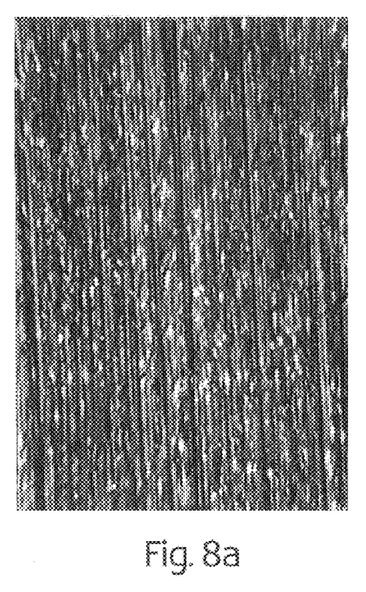
FIG. 8a shows a liquid crystal mixture which can be used for the display cell according to the invention.
Figure 8B:
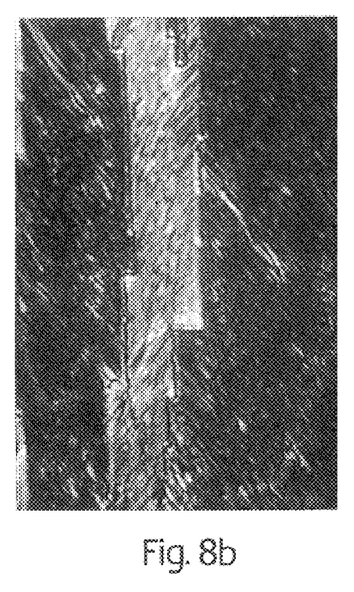
FIG. 8b shows a conventional ferroelectric liquid crystal mixture.

FIGS. 8a and 8b show two polarization micrographs of two cells which each have a layer thickness d of 2 μm and two cross polarizers. FIG. 8a shows a liquid crystal mixture which can be used for the display cell according to the invention and has a phase transition N-$S_c^*$ and FIG. 8b shows a conventional ferroelectric liquid crystal mixture with a phase transition N-$S_A$-$S_c^*$ (here, A represents a configuration in which all liquid crystal molecules are essentially perpendicular to the smectic planes). These micrographs clearly show that the liquid crystal mixture according to the invention has, in the state ready for operation, a strip-like domain structure which is not formed in known ferroelectric display cells.

The liquid crystal cell according to the invention is distinguished by a number of advantages. Thus, the spontaneous formation of the liquid crystal configuration (spontaneous orientation without electrical form) considerably facilitates the production of ferroelectric display cells. Likewise, the display cell according to the invention can be safely heated up to above the clear point since the optimal configuration automatically forms again on cooling. Finally, the display cell according to the invention manages with small driving voltages even in the case of active matrix driving and has a high contrast and a large phase range.

To explain these advantages, a distinction must be made between the microscopic structure and the average macroscopic phenomenon. This is to be explained in more detail below.

The starting point for the explanations below is the configuration, described with reference to FIGS. 1 and 2, of a transmission display cell in which the liquid crystal layer is positioned between the two cross polarizers in such a way that one of the two polarizers is oriented parallel to the rubbing direction and the cell is divided into image point segments which can be electrically driven, for example, by an active matrix.

Let us first consider the macroscopic observations:

As already mentioned, the display cell according to the invention is distinguished, inter alia, by the fact that the display is dark at U=0 and bright at |U|>0, the current-voltage hysteresis characteristic has two maxima of equal magnitude, the birefringence Δn in the field-free state is greater than that in the saturated state and the saturation voltage is relatively small even in the case of very small spontaneous polarization $P_s$ ($P_s$<5 nC/cm$^2$).

At U=0, the optical axis is parallel to the residual transmission is very small. If a voltage is now applied, the display becomes bright. Here, the action of a positive voltage is the same as that of the opposite negative voltage. This permits symmetrical driving in which an image is generated periodically with a positive voltage and with a negative voltage. The possibility of switching back and forth between positive and negative voltages inhibits the formation of ghost images, as is the case, for example, in SSF (Surface Stabilized Ferroelectric Liquid Crystal) displays.

Figure 9:
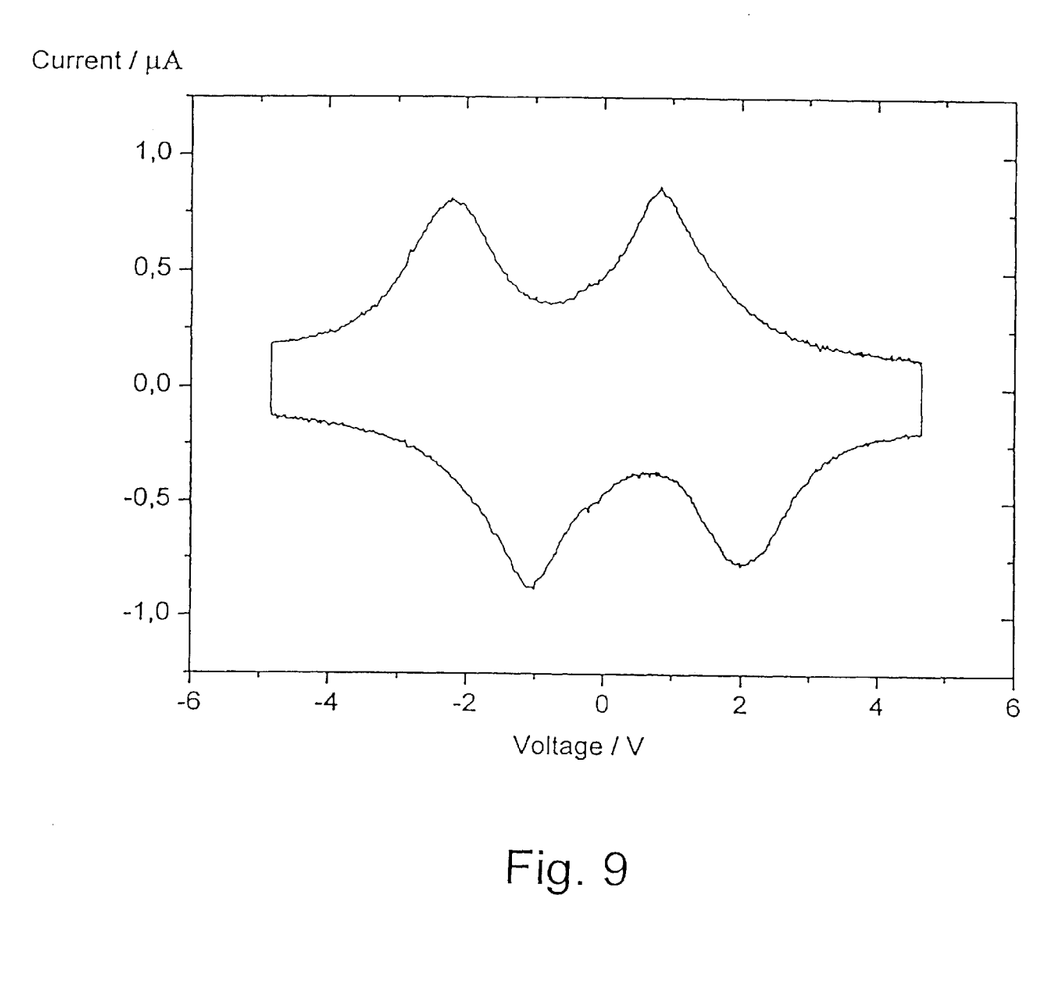
FIG. 9 shows the current-voltage hysteresis characteristic measured with a test mixture A.

FIG. 9 shows the current-voltage hysteresis characteristic measured with the test mixture A at room temperature for a symmetrical delta voltage of ±5 V and 11.3 Hz, applied to the cell. This current-voltage hysteresis characteristic has the above-mentioned maxima, i.e. one for U>0 and one for U<0. This means that half the spontaneous polarizations switch over in each case on going from the negatively saturated voltage to zero and from zero to the positively saturated voltage.

Figure 10:
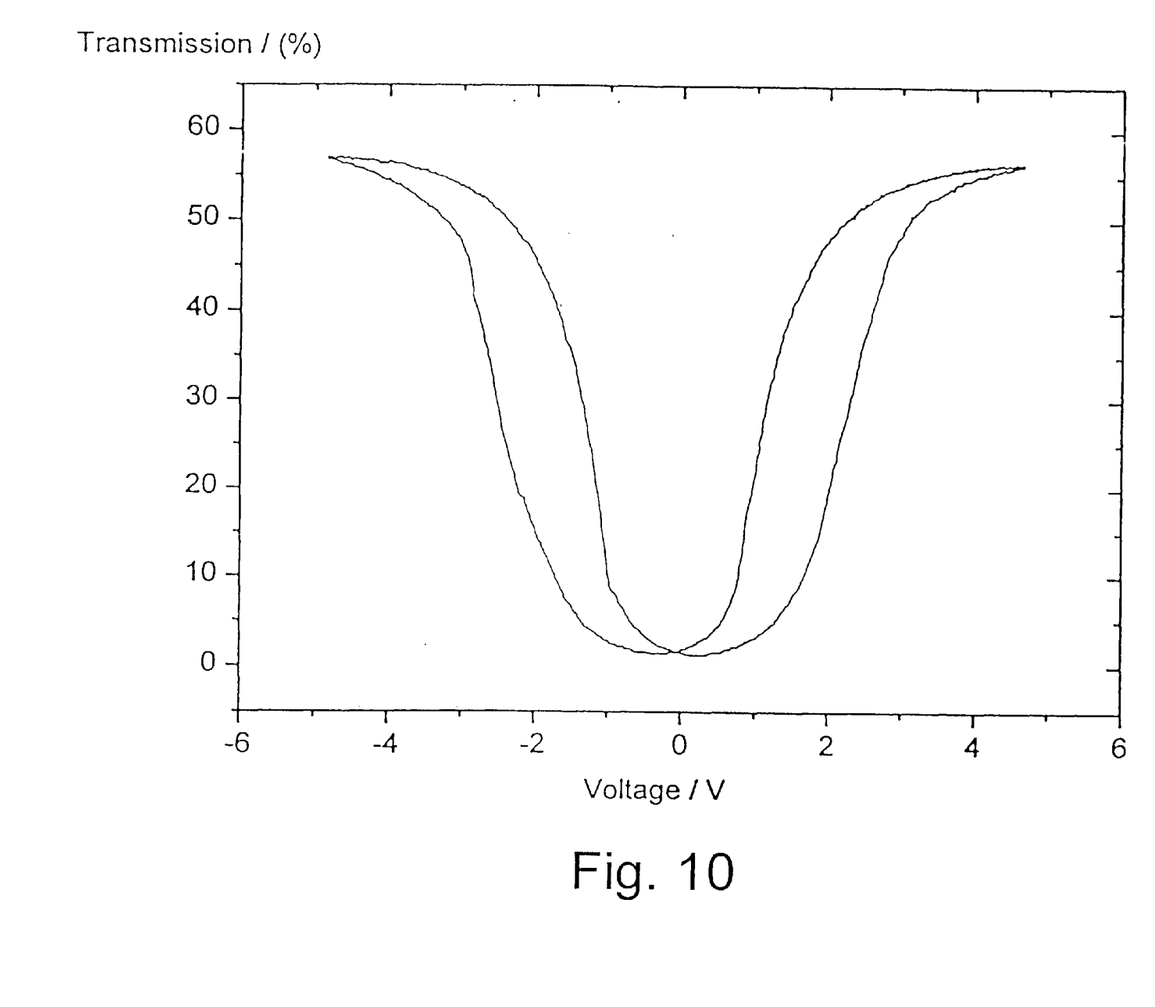
FIG. 10 shows the light-voltage dependence measured with a test mixture A.

In comparison, FIG. 10 shows the light-voltage dependence for the same voltage curve. Apart from the uniform hysteresis indicating switching domain by domain, the light-voltage characteristic is essentially symmetrical with respect to the applied voltage. This hysteresis does not impair the image quality as a result of the periodic voltage change per image since, according to the invention, the voltage always approaches the desired value starting from zero. In preferred embodiments of the invention, the transmittance values of the two positive and negative saturated states differ by not more than 10% from one another (100% transmittance corresponds to the passage of light with parallel polarizers and U=0).

Surprisingly, the birefringence Δn in the field-free state is greater than that in the saturated state when a driving voltage is applied which is so large that a further voltage increase results in no further substantial change in transmittance. This is advantageous because the lower birefringence in the light state permits the use of a larger cell spacing, which is very important for the production of display cells according to the invention. However, the behavior of the birefringence Δn also shows that no antiferroelectric cell is present here since it is just there that the birefringence in the saturated state is greater than in the zero field.

Figure 11:
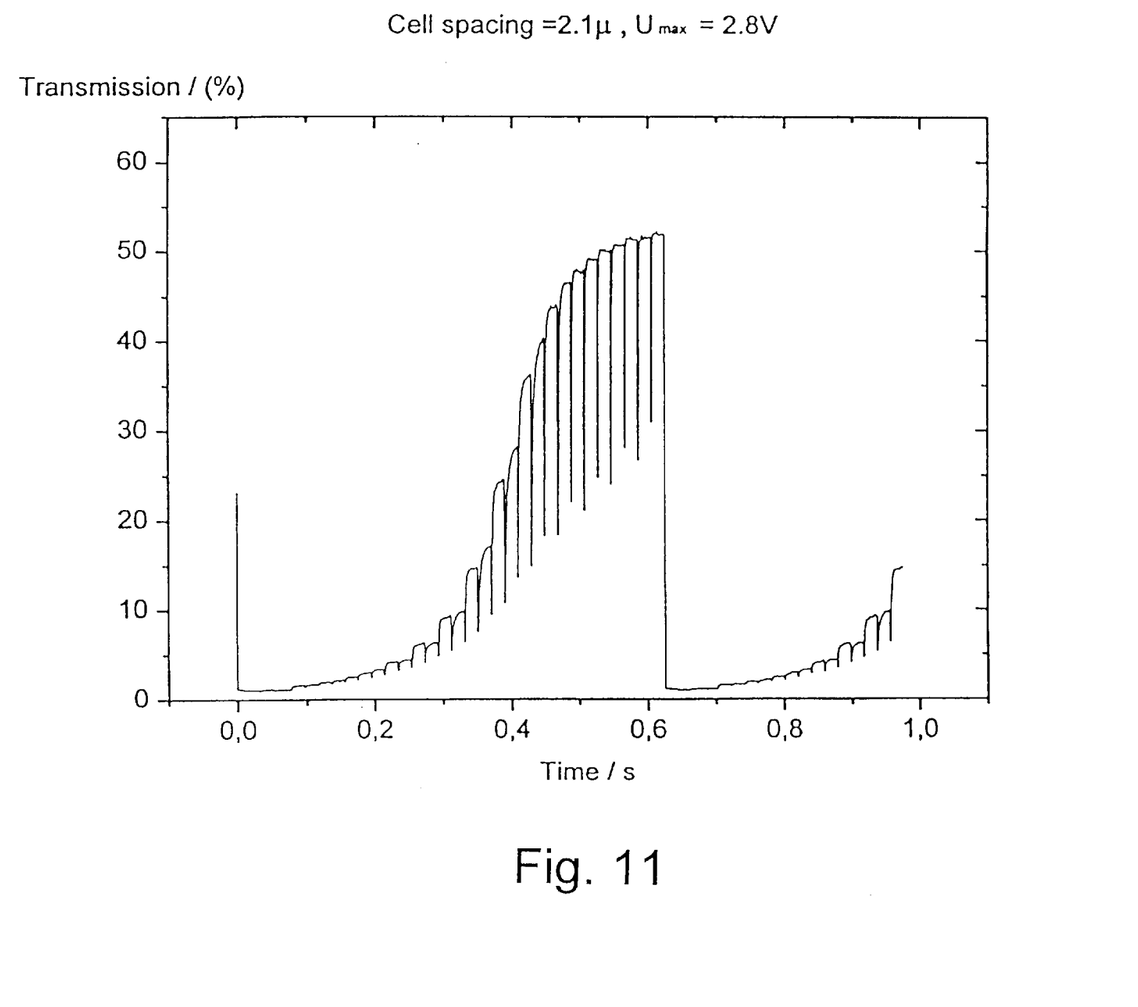
FIG. 11 shows a transmission/% v. time/s measurement with a test mixture B.

Finally, FIG. 11 shows a measurement with the test mixture B. The driving voltage applied to the corresponding display cell during this measurement is composed of a sequence of 16 linearly increasing double pulses, each of which consists of two opposite pulses of equal size and of 20 ms duration each.

This measurement clearly shows that the cell switches completely from the saturated state to darkness at a very low voltage of only 2.8 V, and does so at a high velocity (switching time t<500 μs). FIG. 11 also shows that the display cell according to the invention can represent fine gray steps.

The microscopic appearance is as follows:

A greatly simplified microscopic interpretation of the findings summarized above is shown in FIGS. 3 to 6. Of these, FIG. 3 shows a perspective view of a smectic layer 31 and FIGS. 4 to 6 each show a section through a plurality of smectic layers 41 and 42 adjacent to one another.

In display cells according to the invention, the smectic layers of the liquid crystal layer are essentially perpendicular to the plates of the cell. Furthermore, the molecules of each layer which are arranged parallel to one another are inclined by the tilting angle θ with respect to the normal 32 of the plane, shown in FIG. 3. The angle γ in the X-Z plane also serves for complete characterization of the configuration. For chiral smectic phases without border effects, this angle γ is not constant but increases from layer to layer. If therefore the normal of the plane is followed in the y direction, the molecules of the individual layers move along a cone and thus form the helix stated at the outset and having the helix pitch p. In the present case, however, the helix is coiled up due to edge forces, i.e. γ is about 90°.

Figures 4, 5, 6:
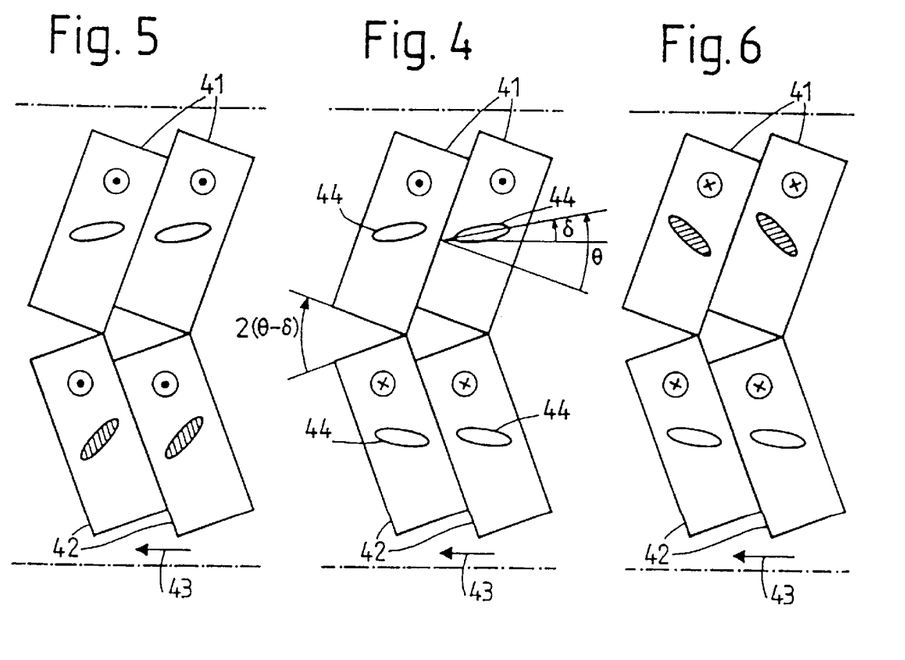
FIGS. 4, 5 and 6 show a simplified, graphic representation of a plurality of smectic layers with the associated molecular orientations as a function of the drive voltage

FIGS. 4, 5 and 6 also indicate the directions of the spontaneous polarizations $P_s$ with • and x (•=$P_s$ in the forward direction; x=$P_s$ in the backward direction) and the projections of the refractive index ellipsoids of the molecules 44 onto the display plane, for a vanishing (FIG. 4, U=0), positive (FIG. 5 U>0) and negative (FIG. 6, U<0) electric field.

The layers 41 and 42 of FIGS. 4, 5 and 6 represent two strip-like domains of the type described above. These are essentially parallel to the rubbing direction 43.

In the field-free state shown in FIG. 4, adjacent domains have spontaneous polarizations $P_s$ in opposite directions. The projections of the optical axes onto the display plane are virtually parallel in the two domains, i.e. they make only a small angle δ with the rubbing direction 43. The liquid crystal layer therefore has its maximum birefringence in this state. With the preferred polarization orientation, the display cell is furthermore dark for U=0. For a sufficiently high driving voltage U, one or other domain switches, depending on the sign of U (shaded refractive index ellipsoids in FIGS. 5 and 6). In the resulting configurations, the molecules of the two domains are then no longer parallel but are rotated through the angle 2 (θ—δ) relative to one another, which explains the observed lower birefringence in the saturated state.

In order to switch from the zero position to the positively saturated configuration, charge must flow to the electrodes. The same charge flows on switching from the negatively saturated cell configuration to zero. The observation that the charge reversal from the negatively saturated to the positively saturated state occurs in two current surges (plate 2) shows that the intermediate state for U=0, shown in FIG. 4, is actually adopted.

This model is certainly a great simplification of the novel electro-optical effect. Thus, a not inconsiderable fraction of the display consists of dislocation lines; furthermore, this representation neglects the fact that the molecules may be tilted out of the plane (γ≠90°) and that the smectic layers need not be exactly perpendicular to the display plane. However, the model explains the observations described above and shows that the display cell according to the invention is a completely novel display type.

That it is also a cell type which differs from the antiferroelectric display cell is shown by the alternating change of direction of the spontaneous polarizations. In the present case, these in fact change their direction not from smectic layer to smectic layer but from domain to domain, which domains in turn each comprise hundreds of smectic planes.

An important property of a display cell driven with alternately positive and negative voltage is the symmetry of the electro-optical response with regard to change of sign. As can easily be seen from FIGS. 4, 5 and 6, this is ensured only when the strip-like domains are distributed as finely as possible and are of equal size. This is automatically the case for the fine lines which form spontaneously in the display cell according to the invention. However, if there is also an $S_A$ phase above the $S_c$, phase and/or if the saturated switching angle α is smaller than 60°, the domains, if present at all, have a larger area and are not linear. The electro-optical response is accordingly asymmetrical in line with the randomness of domain formation, leading to flicker phenomena because the display changes its brightness from image to image.

Owing to the very low operating voltage, the analogous reproducibility of gray steps, high contrast values and the relatively simple production and owing to the advantages already known from ferroelectric display cells, the liquid crystal cell according to the invention is particularly suitable for applications which must process image sequences rapidly. These include, for example, video displays for television sets, video cameras, head-mounted displays, video projectors, multimedia devices, etc.

It should also be pointed out here that the liquid crystal cell described above is only one choice from a plurality of possible embodiments of the invention.

Thus, the display cell according to the invention can be operated not only in transmission, as described above, but also in reflection and may be formed accordingly. The reflector may be diffuse and in this case is combined with a transmitting display according to FIG. 1. However, the reflector may also be specular, which then leads to a cell having a smaller layer thickness d.

Figure 7:
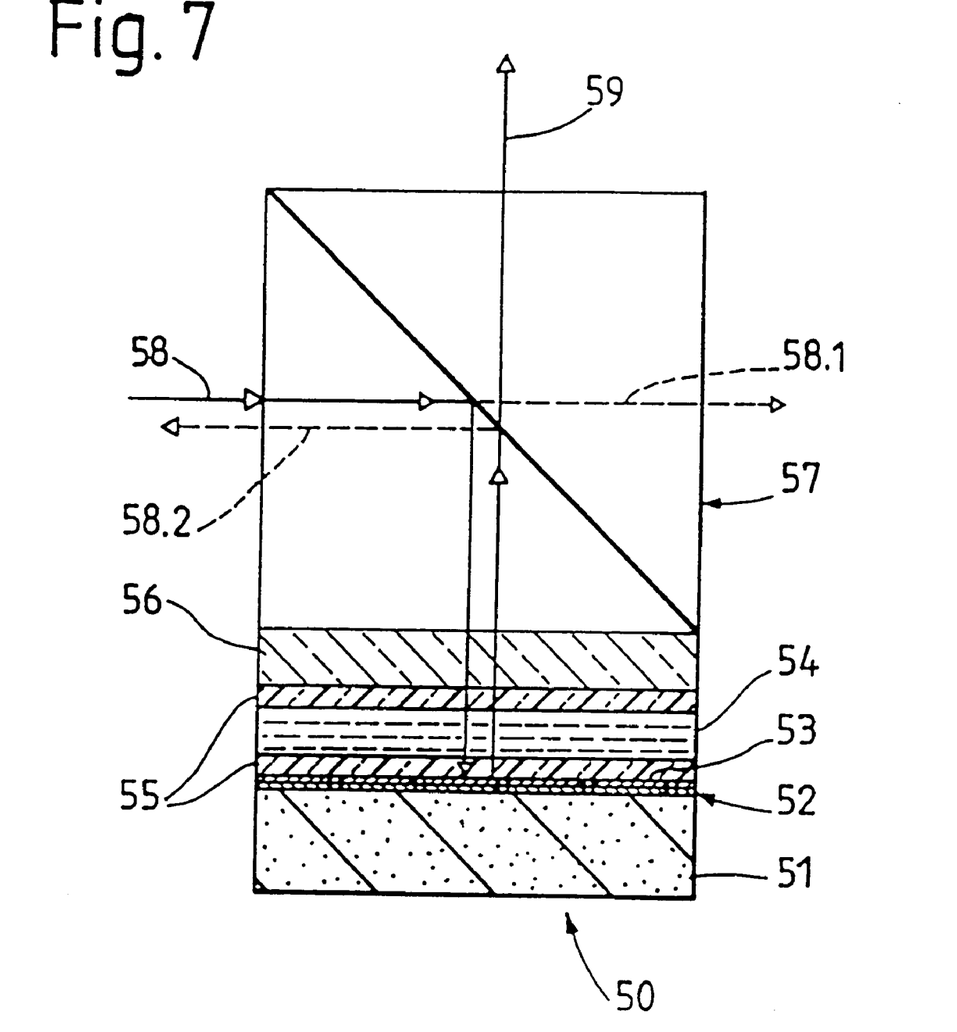
FIG. 7 shows a simplified, schematic representation of a reflecting display cell.

As an example of a specular, reflective application, FIG. 7 shows a part 50 of a reflective projection display according to the invention. Here, a suitable semiconductor structure 52 is applied to a silicon plate 51 to generate the necessary driver voltages. Furthermore, the associated electrodes are each provided with a light-reflecting metal surface 53 and the liquid crystal layer 54 is bounded by the two orientation layers 55. The display furthermore has a second plate, namely a transparent opposite plate 56 with the opposite electrodes not shown, and a polarizing beam divider 57 arranged above the plate 56.

During operation of this display, the light from the projection lamp, not shown, either is split up into the three primary colors and deflected to three different parts 50 or passes through a color filter which lets through red, green and blue light during one third each of the individual image time. In both cases, the light 58 strikes the polarizing beam divider 57 which reflects one polarization component and lets through the other (58.1). The reflected light striking the liquid crystal is thus linearly polarized. It passes through the liquid crystal layer 54 and is reflected back by the reflective electrodes 53 and once again passes through the liquid crystal on the way back. The polarizing beam divider 57 then acts as an analyzer which lets through only the component 59, namely that which is produced by the electro-optically modulated birefringence of the liquid crystal layer. The other component 58.2 is reflected back to the lamp. The modulated light 59 is then projected by a suitable optical system onto the projection screen (back or front projection), in the case of beam division the three beams coordinated with the primary colors being recombined.

Optically, this arrangement corresponds to a display having twice the thickness between two cross polarizers. The functional sequence described above reveals in fact that the light beam produced by the light source and striking the cell passes through the birefringent liquid crystal layer 54 twice before it strikes the analyzer. Accordingly, the distance $d_{eff}$ covered by the light in the liquid crystal is twice as large as the thickness d of the liquid crystal layer, i.e. $2d$. To realize a display cell according to the invention and intended for reflective operation, it is therefore possible to halve the cell thickness d compared with an equivalent transmission display cell, which likewise leads to a halving of the required operating voltages.

TABLE 1

Test mixture A

| Concentration g/g | Structure |
| --- | --- |
| 0.140 |  |
| 0.150 |  |
| 0.206 |  |
| 0.197 |  |
| 0.101 |  |
| 0.101 |  |
| 0.105 |  |

TABLE B

| Concentration g/g | Structure |
|---|---|
| 0.189 | |
| 0.144 | |
| 0.111 | |
| 0.159 | |
| 0.156 | |
| 0.078 | |
| 0.081 | |
| 0.082 | |

What is claimed is:

1. A liquid crystal cell having a ferroelectric, chiral smectic, birefringent liquid crystal layer and at least one polarizer, the cell having a pair of parallel plates which enclose the liquid crystal layer and each of which is provided with a surface structure orienting the molecules of the liquid crystal layer and at least one electrode for generating an electric field with a voltage U, and the liquid crystal layer having a layer thickness d and a saturated switching angle α, wherein the layer thickness d is smaller than the helix pitch p of the liquid crystal layer, wherein the saturated switching angle α is sufficient to give rise to linear liquid crystal domains and the liquid crystal layer, upon cooling from an isotropic phase, forms a cholesteric N phase before the $S_c^*$ phase, wherein the optical path difference $\Delta n \cdot d_{eff}$ of the cell at U=0 is greater than in the saturated state, $\Delta n$ being the birefringence and $d_{eff}$ the distance covered by the light in the liquid crystal between a polarizer and an analyzer, and wherein the current-voltage characteristic of the cell has two maxima, one for U>0 and one for U<0.

2. A liquid crystal cell intended for a transmission display and as claimed in claim 1, wherein the light transmittance values of the positively and negatively saturated states differ from one another by not more than 10%.

3. A liquid crystal cell intended for reflecting operation and as claimed in claim 1, wherein said cell has a specular or a diffuse mirror.

4. A liquid crystal cell as claimed in any of claims 1 to 3, wherein the surface structure is formed by orientation layers rubbed parallel and wherein at least one polarizer is parallel to the rubbing direction.

5. A liquid crystal cell as claimed in any of claims 1 to 4, which comprises two polarizers arranged perpendicular to one another.

6. A display means containing the liquid crystal cell as claimed in any of claims 1 to 5.

7. A display means as claimed in claim 6, which is a video camera, a display for a television set, a head mounted display, a video projector or a multimedia device.

8. A display means as claimed in claim 7, which is a video camera, a display for a television set, a head-mounted display, a video projector or a multimedia device.

9. A liquid crystal cell having a ferroelectric, chiral smectic, birefringent liquid crystal layer and at least one polarizer, the cell having a pair of parallel plates which enclose the liquid crystal layer and each of which is provided with a surface structure orienting the molecules of the liquid crystal layer so as to give rise to a helix having a pitch p, and at least one electrode for generating an electric field with a voltage U, and the liquid crystal layer having a layer thickness d and a saturated switching angle $\alpha$, wherein the layer thickness d is smaller than the helix pitch p of the liquid crystal layer, the current-voltage characteristic of the cell has two maxima, one for U>0 and one for U<0, and the spontaneous polarization does not change in sign from molecular plane to molecular plane.

10. A liquid crystal cell having a ferroelectric, chiral smectic, birefringent liquid crystal layer and at least one polarizer, the cell having a pair of parallel plates which enclose the liquid crystal layer and each of which is provided with a surface structure orienting the molecules of the liquid crystal layer, and at least one electrode for generating an electric field with a voltage U, and the liquid crystal layer having a layer thickness d and a saturated switching angle $\alpha$, wherein the optical path difference $\Delta n \cdot d_{eff}$ of the cell at U=0 is greater than in the saturated state, $\Delta n$ being the birefringence and $d_{eff}$ the distance covered by the light in the liquid crystal between a polarizer and an analyzer, and wherein the current-voltage characteristic of the cell has two maxima, one for U>0 and one for U<0.

11. The liquid crystal cell as recited in claim 10 wherein the layer thickness d of the cell is smaller than the helix pitch p of the liquid crystal layer.

12. The liquid crystal device recited in claim 11 wherein the saturated switching angle $\alpha$ is sufficient to give rise to linear liquid crystal domains.

13. The liquid crystal device recited in claim 9 wherein the saturated switching angle $\alpha$ is sufficient to give rise to linear liquid crystal domains.

14. The liquid crystal device recited in claim 10 wherein the saturated switching angle $\alpha$ is sufficient to give rise to linear liquid crystal domains.

15. The liquid crystal display recited in claim 9 wherein the display is dark when U=0 and bright when U=<0 and when U=>0.

16. The liquid crystal device recited in claim 9 wherein the saturation voltage is low and the spontaneous polarization is <5 $nC/cm^2$.

17. The liquid crystal device of claim 10 wherein the spontaneous polarization is <5 $nC/cm^2$ and does not change it sign from molecular plane to molecular plane.

18. The liquid crystal device recited in claim 17 wherein the saturated switching angle $\alpha$ is sufficient to give rise to linear liquid crystal domains.

* * * * *

UNITED STATES PATENT AND TRADEMARK OFFICE
CERTIFICATE OF CORRECTION

PATENT NO. : 6,111,631
DATED : August 29, 2000
INVENTOR(S) : Jürg Funfschilling et al.

It is certified that error appears in the above-identified patent and that said Letters Patent is hereby corrected as shown below:

<u>Title page,</u>
Item [73], Assignee, "Zurich" should read -- Zug --.

<u>Column 12, claim 5,</u>
Should be re-numbered as claim 6.

<u>Column 13, claim 6,</u>
Should be re-numbered as claim 7.

<u>Column 13, claim 7,</u>
Should be re-numbered as claim 8; "as claimed in claim 6" should read -- as claimed in claim 7 --; "head mounted" should be read -- head-mounted --.

<u>Column 13, claim 8,</u>
Should be deleted.

<u>Column 12, claim 5,</u>
Should be inserted after claim 4 as follows:
-- A liquid crystal cell as claimed in claim 1, wherein the surface structure is formed by photo-oriented orientation layers and wherein at least one polarizer is parallel to the direction preffered by the photo-orientation process --.

<u>Column 14, claim 17,</u>
Line 26, "it sign" should read -- in sign --.

Signed and Sealed this

Sixteenth Day of April, 2002

Attest:

Attesting Officer

JAMES E. ROGAN
*Director of the United States Patent and Trademark Office*